(12) United States Patent
Baccigalopi

(10) Patent No.: US 8,986,547 B2
(45) Date of Patent: Mar. 24, 2015

(54) SUBSEA CONTAMINATE REMEDIATION APPARATUS AND METHODS

(76) Inventor: Michael J. Baccigalopi, Rockport, TX (US)

( * ) Notice: Subject to any disclaimer, the term of this patent is extended or adjusted under 35 U.S.C. 154(b) by 440 days.

(21) Appl. No.: 13/417,780

(22) Filed: Mar. 12, 2012

(65) Prior Publication Data
US 2012/0267320 A1  Oct. 25, 2012

Related U.S. Application Data

(60) Provisional application No. 61/478,024, filed on Apr. 21, 2011, provisional application No. 61/505,035, filed on Jul. 6, 2011.

(51) Int. Cl.
| | |
|---|---|
| *E02B 15/04* | (2006.01) |
| *B23K 31/02* | (2006.01) |
| *B01F 5/04* | (2006.01) |
| *B01F 7/22* | (2006.01) |
| *B01F 15/00* | (2006.01) |
| *B01F 3/08* | (2006.01) |
| *E21B 41/00* | (2006.01) |
| *E21B 43/01* | (2006.01) |
| *E02B 15/00* | (2006.01) |
| *C02F 1/72* | (2006.01) |
| *C02F 101/32* | (2006.01) |
| *C02F 103/00* | (2006.01) |
| *C02F 103/08* | (2006.01) |

(52) U.S. Cl.
CPC ............ *B23K 31/027* (2013.01); *E02B 15/042* (2013.01); *E02B 2015/005* (2013.01); *B23K 2201/06* (2013.01); *B23K 2201/20* (2013.01); *B23K 2203/04* (2013.01); *B23K 2203/10* (2013.01); *B23K 2203/14* (2013.01); *B01F 5/0473* (2013.01); *B01F 5/0475* (2013.01); *B01F 7/22* (2013.01); *B01F 15/00928* (2013.01); *B01F 3/0853* (2013.01); *B01F 3/0865* (2013.01); *C02F 1/72* (2013.01); *C02F 2101/32* (2013.01); *C02F 2103/007* (2013.01); *C02F 2103/08* (2013.01); *E21B 41/0007* (2013.01); *E21B 43/0122* (2013.01); *Y10S 210/922* (2013.01); *Y10S 210/925* (2013.01)
USPC .................... 210/747.5; 210/170.11; 210/922; 210/925; 166/359; 166/364; 366/173.B;66/174.1; 405/60

(58) Field of Classification Search
CPC ............ E02B 15/042; E02B 2015/005; E21B 41/0007; E21B 43/0122; C02F 1/40; C02F 2103/007; B01F 3/0853; B01F 3/0865; B01F 5/0473; B01F 5/0475; B01F 7/22; B01F 15/00928
USPC .................... 210/747.5, 747.6, 170.09, 170.1, 210/170.11, 922, 923, 925; 405/60; 166/359, 364, 367; 366/167.1, 173.1, 366/174.1, 181.6
See application file for complete search history.

(56) References Cited

U.S. PATENT DOCUMENTS

| | | | | |
|---|---|---|---|---|
| 2,794,711 | A | * | 6/1957 | Hall et al. .................. 366/174.1 |
| 3,671,022 | A | * | 6/1972 | Laird et al. ............... 210/170.09 |
| 3,695,810 | A | * | 10/1972 | Heagler ....................... 210/922 |

(Continued)

*Primary Examiner* — Christopher Upton
(74) *Attorney, Agent, or Firm* — Greenberg Traurig, LLP

(57) ABSTRACT

A subsea contaminate remediation apparatus is provided. The apparatus includes a conduit. The conduit includes a first end adapted to receive a first liquid stream having at least one contaminate; a second end adapted to release a second liquid stream; a grating associated with the second end of the housing; and at least one chemical injection port. The chemical injection port is adapted to introduce a chemical to the first liquid stream to form the second liquid stream.

10 Claims, 5 Drawing Sheets

(56) References Cited

U.S. PATENT DOCUMENTS

| | | | |
|---|---|---|---|
| 4,290,714 A * | 9/1981 | Strange | 405/60 |
| 4,416,565 A * | 11/1983 | Ostlund | 210/170.11 |
| 4,449,850 A * | 5/1984 | Cessou et al. | 405/60 |
| 4,456,071 A * | 6/1984 | Milgram | 166/364 |
| 5,213,444 A * | 5/1993 | Henning | 405/60 |
| 2005/0025574 A1* | 2/2005 | Lazes | 405/60 |
| 2011/0315393 A1* | 12/2011 | Wolinsky | 405/60 |
| 2012/0217195 A1* | 8/2012 | Morgenthaler | 210/170.11 |

* cited by examiner

SUBSEA CONTAMINATE REMEDIATION APPARATUS AND METHODS

CROSS-REFERENCE TO RELATED APPLICATION

This Non-Provisional patent application claims the benefit of and priority to prior Provisional Patent Application Nos. 61/478,024, filed on Apr. 21, 2011, and 61/505,035, filed on Jul. 6, 2011.

FIELD OF THE DISCLOSURE

The present disclosure relates generally to a subsea contaminate remediation apparatus and methods thereof. In particular, the present disclosure relates to an apparatus for remediation of underwater oil, or natural gas, leaks, and methods thereof.

BACKGROUND

Subsea, or underwater, contamination events may be caused by for example natural venting or madmade events such as broken or otherwise non-functioning pipes, valves, nozzles, and wellheads. Such contamination events may require remediation tools and methods in order to stop, slow, correct, or reverse any immediate or future environmental impact. A non-limiting example of a subsea contamination event within the scope of the present disclosure is the Deepwater Horizon oil spill of 2010.

SUMMARY OF THE DISCLOSURE

In accordance with an illustrative embodiment of the disclosure illustrated herein is a subsea contaminate remediation apparatus. The apparatus may include a conduit. The conduit may comprise: a first end adapted to receive a first liquid stream having at least one contaminate; a second end adapted to release a second liquid stream; a grating associated with the second end of the housing; and at least one chemical injection port. The chemical injection port is adapted to introduce a chemical to the first liquid stream to form the second liquid stream.

In accordance with a second illustrative embodiment of the disclosure illustrated herein is a method for remediating a contamination event using a subsea contaminate remediation apparatus. The apparatus may include a conduit. The conduit may comprise: a first end adapted to receive a first liquid stream having at least one contaminate; a second end adapted to release a second liquid stream; a grating associated with the second end of the housing; and at least one chemical injection port. The chemical injection port is adapted to introduce a chemical to the first liquid stream to form the second liquid stream. The method may further include positioning the first end of the conduit of the subsea contaminate remediation apparatus in fluid communication with the first stream having a contaminate; introducing the chemical through the at least one chemical injection port to the first stream to produce the second liquid stream; and directing the second liquid stream to flow past the mesh and be turbulently released through the second end of the conduit of the subsea contaminate remediation apparatus.

In an embodiment, throughout this disclosure the term "subsea" means occurring or existing under any body of water, including the sea, ocean, lake, manmade or natural reservoir, and the like.

While subsea contaminate remediation apparatuses and methods thereof will be described in connection with various preferred illustrative embodiments, it will be understood that it is not intended to limit the subsea contaminate remediation apparatuses and methods thereof to those embodiments. On the contrary, it is intended to cover all alternatives, modifications, and equivalents as may be included within the spirit and scope of the invention as defined by the to-be appended claims.

BRIEF DESCRIPTION OF THE DRAWING FIGURES

The present subsea contaminate remediation apparatus and method of using a subsea contaminate remediation apparatus may be understood by reference to the following description taken in conjunction with the accompanying drawing figures, which are not to scale and contain certain aspects in exaggerated or schematic form in the interest of clarity and conciseness, wherein the same reference numerals are used throughout this description and in the drawing for components having the same structure, and primed or lettered reference numerals are used for components having a similar function and construction to those elements bearing the same unprimed or unlettered reference numerals, and wherein:

Figure 1:
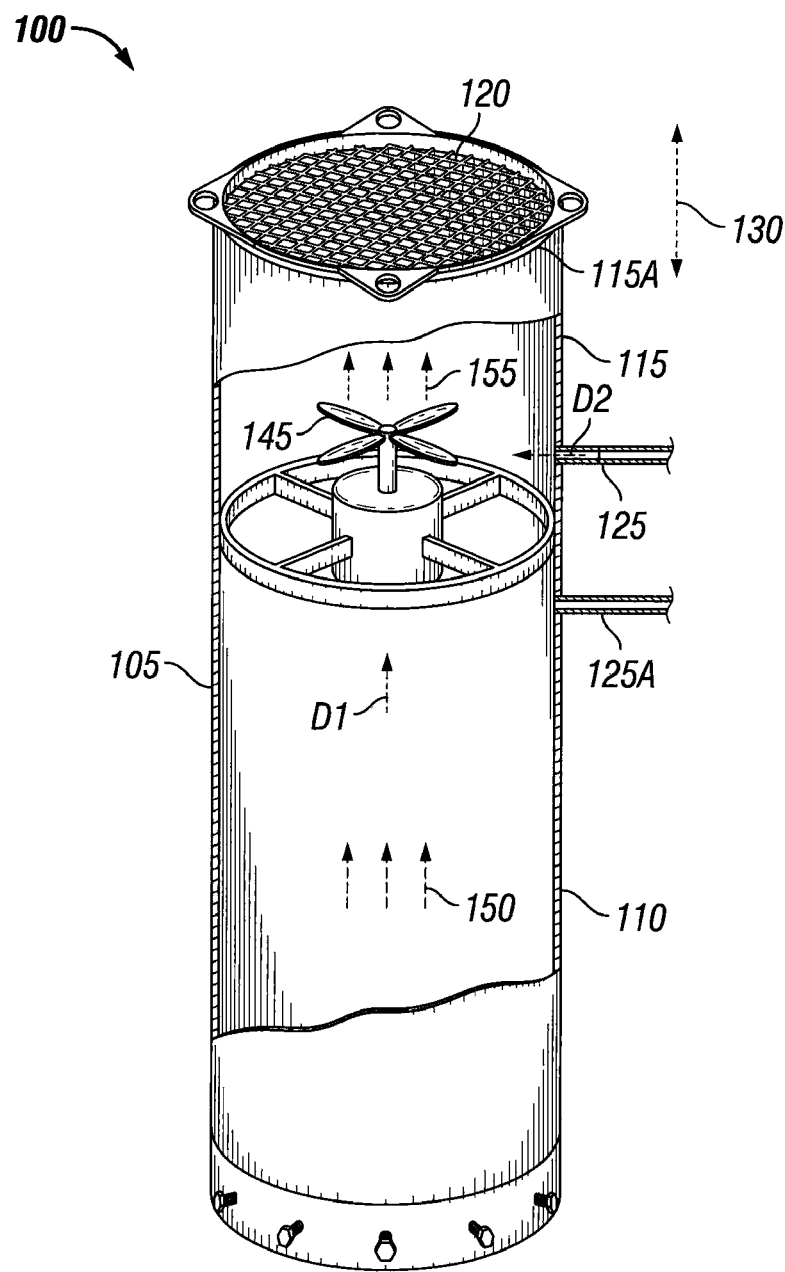
FIG. 1 is a cross-sectional view according to an illustrative embodiment of the present subsea contaminate remediation apparatus.
Figure 7A:
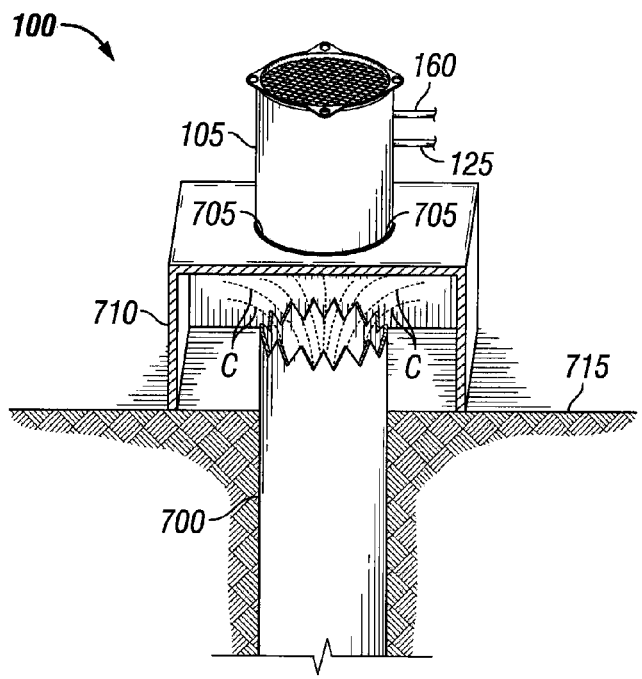
Figure 7B:
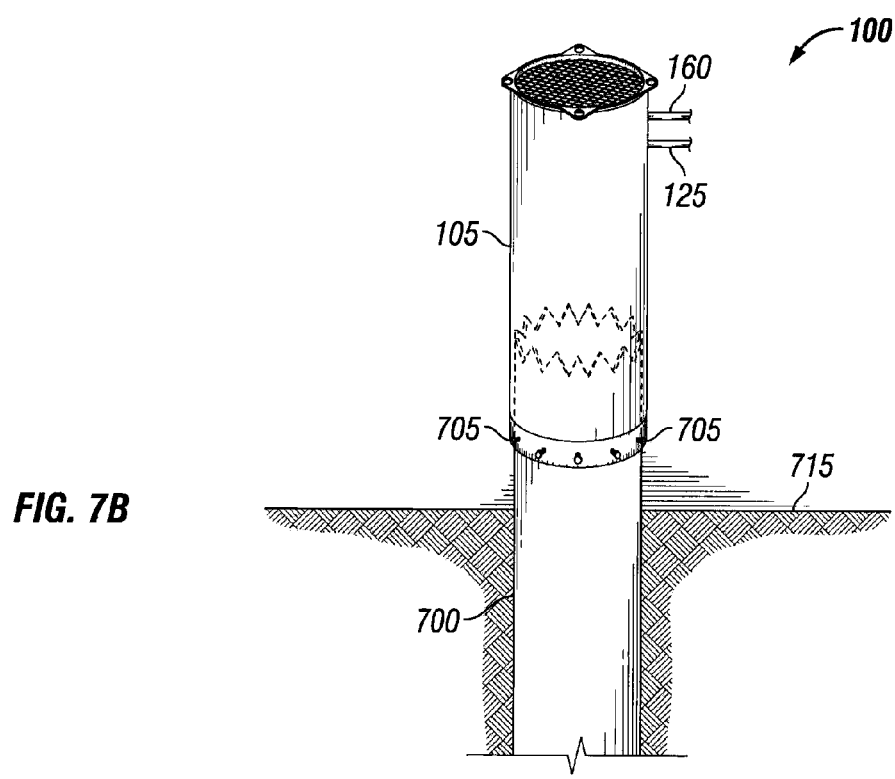

FIG. 7A is a perspective view of the subsea contaminate remediation apparatus according to the illustrative embodiment of the subsea contaminate remediation apparatus of FIG. 1 affixed to a structure; and FIG. 7B is a perspective view of a perspective view of the subsea contaminate remediation apparatus according to the illustrative embodiment of the subsea contaminate remediation apparatus of FIG. 1 affixed to a substructure.

DETAILED DESCRIPTION OF THE EMBODIMENT

With reference to FIG. 1, a subsea contaminate remediation apparatus 100 is provided. In an embodiment, the subsea contaminate remediation apparatus 100 may include a conduit 105 having a first end 110, a second end 115, a grating 120, and at least one chemical injection port 125. In an embodiment, the conduit 105 may be formed of any material having the requisite strength and corrosion and erosion resistance properties suitable for use in subsea contamination event environments. Such environments may include great underwater depths resulting in high pressures (without limitation up to about 250 atmospheres) and exposure to high flux and/or high flow rates (without limitation up to about 100,000 bbls per day) liquid streams carrying entrained solids and contaminates. Thus, without limitation the conduit 105 may be formed of materials such as steel, high-strength aluminum, titanium, ceramics, graphites including materials containing carbon nanotubes, any of the forgoing materials having polymer(s) coating(s), and combinations thereof. Further, the conduit 105 may be of any length along a longitudinal axis 130 and may have any, or multiple, geometric cross sections, perpendicular to its longitudinal axis 130, including without limitation circular, triangular, square, rectangular, pentagonal, hexagonal, heptagonal, octagonal, nonagonal, decagonal, and the like. In a still further embodiment (not shown), the conduit 105 may have cross sections of varying average diameters along the longitudinal axis such that its shape expands or contracts.

Figure 2:
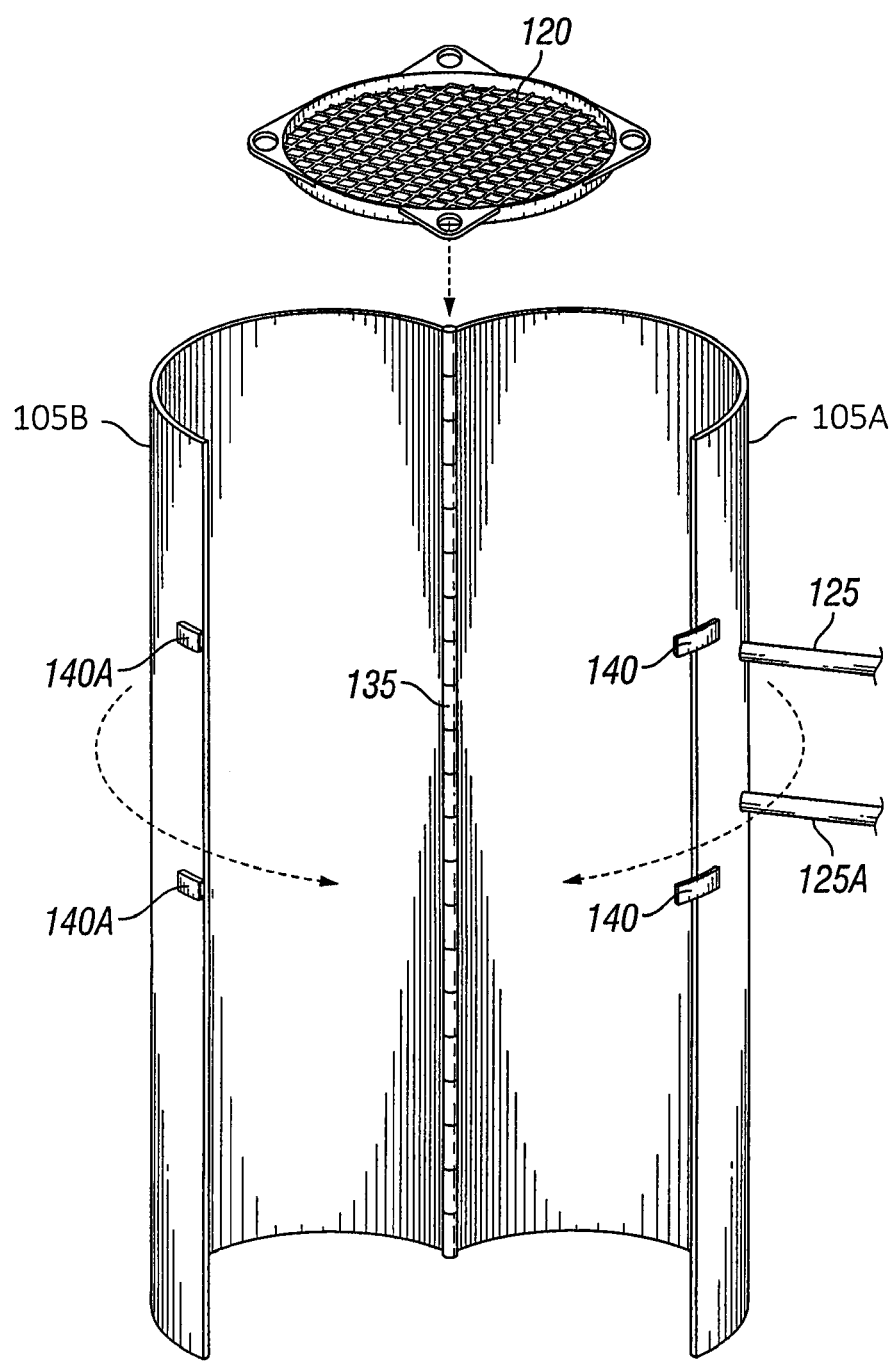
FIG. 2 is a cross-sectional view of the subsea contaminate remediation apparatus of FIG. 1 in an open configuration.

In an embodiment, the conduit 105 may be formed of a single integral piece, either "as cast," "as molded," or after subparts have been welded or otherwise affixed to each other. In an alternative embodiment, the conduit 105 may be formed of two or more movable or hinged components such as the first shell 105A and the second shell 105B of FIG. 2. Continuing with reference to FIG. 2, the conduit 105 may further include one or more hinges 135 and one or more latches 140 with respective cooperating apertures, slots, or elements 140A. Preferably, the hinges 135, latches 140, and cooperating elements 140A are of a suitable strength and corrosion and erosion resistant to withstand the above-described subsea contamination event environments. In a still further embodiments (not shown), the conduit 105 may be formed of telescoping or otherwise expandable components.

With reference to FIG. 1, the first end 110 of the conduit 105 may be adapted to receive a first liquid stream 150 having at least one contaminate (not shown), and optionally flowing in a first direction, D1, along the longitudinal axis 130. In an embodiment, the size and shape of the first end 110 will be dependent upon many factors including the size and velocity of the first liquid stream 150. The first liquid stream 150 may include anywhere from trace amounts, on the order of for example 1 part per billion, up to 100 volume percent of contaminate, and the balance water and entrained solids. Non-limiting examples of contaminate include crude oil, natural gas, and substances such as refined petroleum products including without limitation NAPTA, LPG, gasoil, anthracene, benzene, toluene, xylene, and the like. Non-limiting examples of entrained solids include salt and other minerals, sand, sea life, debris, and the like.

The conduit 105 may include any number of, alternatively between one and four, chemical injection ports 125, 125A. In an embodiment, the chemical injection ports 125, 125A may be located between the first 110 and second 115 ends of the conduit 105. The chemical injection ports 125, 125A may be adapted to introduce the chemical (not shown) from a chemical source (300, FIG. 3) to the first liquid stream 150 to form the second liquid stream 155. In an embodiment, the chemical is introduced in a second direction indicated by arrow D2, which is generally perpendicular to the first direction D1; however, in alternative embodiments (not shown) the directions D1 and D2 may be of any relative orientation, including without limitation generally parallel. In an embodiment and without wishing to be bound by the theory, Applicant believes that the introduction of the chemical to the first liquid stream 150 causes the second liquid stream 155 to be better mixed as by causing eddies or recirculation, or turbulent, chaotic, or otherwise non-laminar flow. In an embodiment, a fan blade, propeller or stirring instrument 145 may be affixed to an inside portion of the conduit 105 to assist in mixing the chemical with the first stream 150. In an alternative embodiment, the introduction of the chemical to the first liquid stream 150 may have a relatively negligible impact on the flow of the resulting second liquid stream 155.

Figure 3:
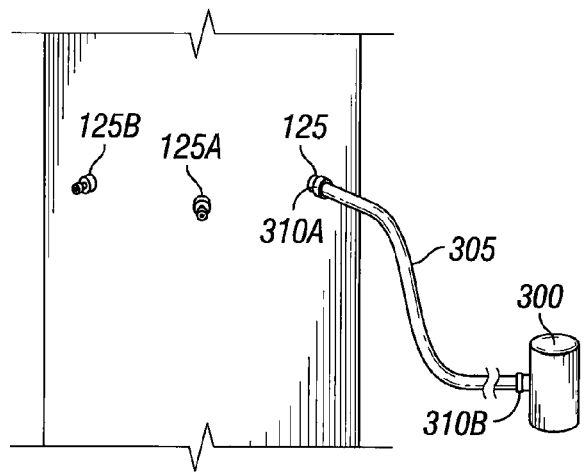
FIG. 3 is a schematic perspective view of a subsea contaminate remediation apparatus according to the illustrative embodiment of the subsea contaminate remediation apparatus of FIG. 1.

With reference to FIG. 3, the chemical source 300 may be any suitable container for storing the chemical. In an embodiment, the chemical may be carried from the chemical source 300 to any one or multiple the chemical injection ports 125, 125A, 125B through a hose or tube 305 (or multiple hoses or tubes). In an embodiment, the hose or tube 305 may have quick connection couplings 310A, 310B on either end suitable for engagement with the chemical source 300 and chemical injection port 125. In an embodiment, the chemical may be carried from the chemical source 300 to the chemical injection port 125 through a manifold, hose, or tube (not shown) having an inlet for receiving chemical from the chemical source 300 and multiple outlets for dispensing chemical through multiple tubes to respective chemical injection ports. The chemical may be any material suitable for remediating or mitigating the environmental impact of the contaminate. Accordingly, the nature and chemical composition of the chemical will depend on the contaminate, environmental event, and other factors. Non-limiting examples of suitable chemicals may include dispersants such as without limitation Corexit 9500 and Corexit 9527, available from Nalco Holding Company, located in Naperville, Ill.

In an embodiment, the grating 120 may be associated with the second end 115 of the conduit 105. In an alternative embodiment, the grating 120 may be affixed about or to the distal portion 115A of the second end 115 of the conduit 105. In a still further embodiment, the grating 120 may be affixed to the conduit 105 at a location along the longitudinal axis 130 of the conduit 105 before the distal portion 115A of the second end 115. In still further embodiment, the grating 120 may be removably affixed to the second end 115 of the conduit 105 such as for example by sliding the grating 120 of the distal portion 115A of the second end 115 and affixing it by pins, bolts, latches, welds, and the like (not shown). Alternatively, the grating 120 may be affixed to the second end 115 in an open configuration (not show) and telescoped or otherwise moved into the closed configuration as illustrated in FIG. 1.

Figure 4A:
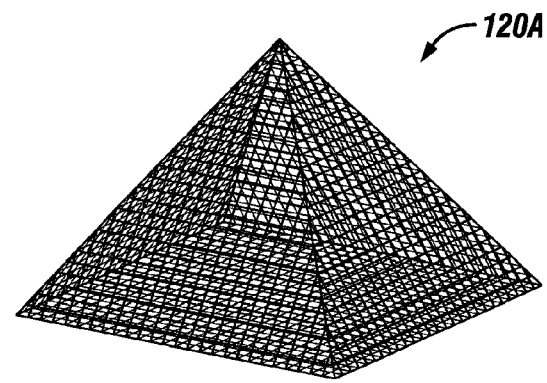
FIG. 4A is a perspective view of an alternative grating.
Figure 4B:
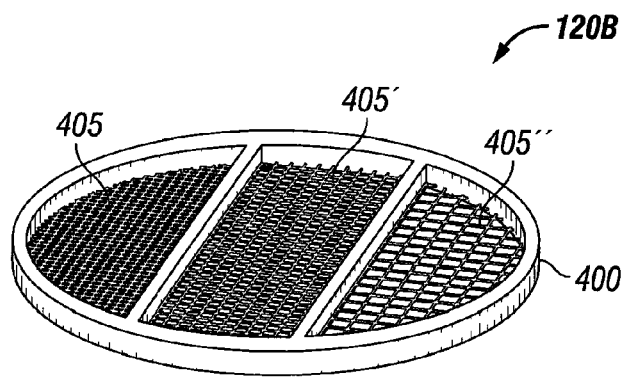
FIG. 4B is a perspective view of a second alternative grating.

In an embodiment, the grating 120 may be of a size, spacing, mesh, and material such that the flow of the second liquid stream 155 is turbulent after it passes past the grating 120. In an embodiment, the grating 120 may be of a shape approximately equal to that of the shape of the cross-section of the second end 115 of the conduit. An alternative grating 120A (FIG. 4A) may be more three-dimensional in geometry having a pronounced conical, pyramidal, or the like shape. A second alternative grating 120B (FIG. 4B) may include a housing 400 (having any shape including tubular) having a plurality of subgratings 405, 405', 405", wherein each subgratings 405, 405', 405" may have a different mesh size. Without wishing to be bound by the theory, Applicant believes that a turbulent flow of the second liquid stream 155 better mixes the chemical with the contaminate and better disperses the contaminate within the external subsea environment which facilitates natural decomposition of the contaminate.

Figure 5:
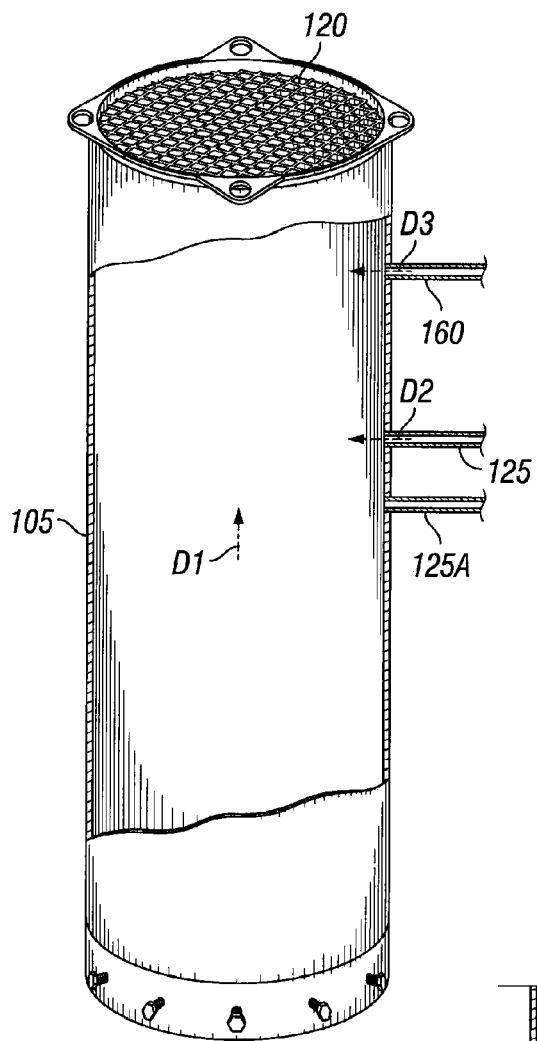
FIG. 5 is a cross-sectional view according to an alternative illustrative embodiment of the present subsea contaminate remediation apparatus.

In a still further embodiment, with reference to FIG. 5, the conduit 105 may further include any number of, alternatively between one and four, in-situ burn injection ports 160. In an embodiment, the in-situ burn injection ports 160 may be located between the chemical injection ports 125, 125A and the second 115 end of the conduit 105. The in-situ burn injection ports 160 may be adapted to introduce an in-situ burn chemical (hereinafter "ISBC") (not shown) from a ISBC source (not shown) to the second liquid stream 155. In an embodiment, the ISBC may be introduced in a third direction indicated by arrow D3, generally perpendicular to the first direction D1 and generally parallel to the second direction D2; however, in alternative embodiments (not shown) the directions D1, D2, and D3 may each independently be of any relative orientation to each other. In an embodiment, upon contact of ISBC with the second stream 155 at least a portion of the contaminate may be enriched with oxygen, or otherwise become oxidized. In an embodiment, upon contact of ISBC with the second stream 155 at least a portion of the contaminate may ignite, combust, or otherwise burn. In an alternative embodiment, the ISBC may be introduced to the to the contaminate through a delivery system (not shown) external to the conduit 105. For example, the ISBC may contact the contaminate after the contaminate exits the conduit 105 and raises to (or is otherwise at) approximately the surface of water body. In this embodiment, the contaminate may be enriched with oxygen, oxidized, ignited, combusted, or burned at or near the surface of the water body.

In an embodiment, suitable ISBC may be any material that can ignite, combust, or otherwise burn, upon contact with the contaminate. In a non-limiting example if the contaminate includes oil a suitable oxidizer, ISBC may be hydrogen peroxide. Other non-limiting examples of suitable ISBC may include sodium hypochlorite ("NaClO"), bleach (preferably diluted), and liquid "pool" chlorine. In an alternative embodiment, oxygen may be introduced to the contact of ISBC and contaminate to facilitate combustion. In one embodiment, oxygen may be introduced through an electrolysis of water process, such as the reaction of a battery connected to zinc and copper.

Figure 6:
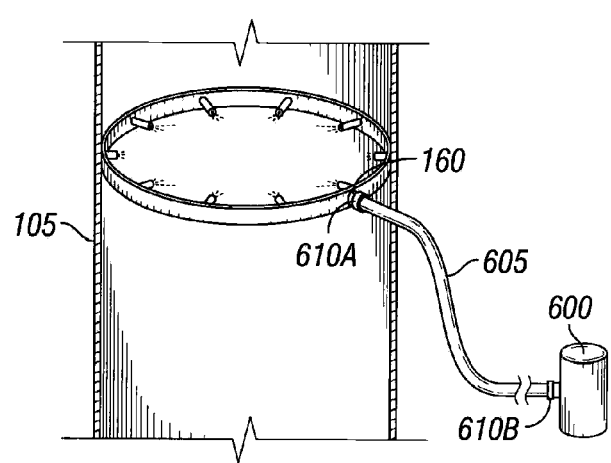
FIG. 6 is a schematic perspective view of a subsea contaminate remediation apparatus according to the illustrative embodiment of the subsea contaminate remediation apparatus of FIG. 5.

With reference to FIG. 6, the ISBC source 600 may be any suitable container for storing ISBC. In an embodiment, the ISBC may be carried from the ISBC source 600 to the in-situ burn injection port(s) 160 through a hose or tube 605 (or multiple hoses or tubes). In an embodiment, the hose or tube 605 may have quick connection couplings 610A, 610B on either end suitable for engagement with the ISBC source 600 and in-situ burn injection ports 160. In an embodiment, the ISBC may be carried from the ISBC source 600 to the in-situ burn injection ports 160 through a manifold, hose, or tube (not shown) having an inlet for receiving ISBC from the ISBC source 600 and multiple outlets for dispensing ISBC through multiple tubes to respective in-situ burn injection ports. Without wishing to be bound by the theory, Applicant believes that igniting, combusting, or otherwise burning various contaminates may mitigate the contaminate's impact on the environment.

With respect to FIGS. 7A and 7B and in various embodiments, methods are provided for remediating a contamination event that may include using the apparatus 100 as described above and in connection with the appended claims. The method may include positioning the first end 110 of the conduit 105 of the subsea contaminate remediation apparatus in fluid communication with the first stream 150 having a contaminate. In an embodiment, the first end 110 may be positioned in fluid communication with the first stream 150 when an appreciable amount of first stream 150 flows past, or into, the first end 110 and into the conduit 105. In an embodiment, the first end 110 may be removably or permanently affixed to a structure 700 emitting, flowing, spewing, or supplying contaminate by one or more pins, bolts, latches, welds, and the like 705. The structure 700 may be located in, or protruding through, the ocean/sea floor, or a ship's hull, 715. In an alternative embodiment, the first end 110 may be removably or permanently affixed to a substructure 710 by one or more pins, bolts, latches, welds, and the like 705. In the alternative embodiment, the substructure 710 may be placed at or near the structure 700 emitting, flowing, spewing, or supplying contaminate, C, but not physically attached thereto. In an embodiment, before—and preferably after—the first end 110 of the conduit 105 is positioned, chemical may be introduced through the at least one chemical injection port 125 to the first stream 150 to produce the second liquid stream 155. The second stream 155 may be directed to flow past the mesh 120 and be released, optionally turbulently released, through the second end 115 of the conduit 105. Optionally, ISBC may be introduced through the at least one ISBC injection port 160 to the second stream 155 to burn or otherwise ignite at least a portion of the contaminate C.

In still further embodiments, after the first end 110 of the conduit 105 has been placed in communication with the first stream 150, the shells of the conduit 105 may be closed about themselves and latched or otherwise affixed together. In a still further embodiment, after the first end 110 of the conduit 105 has been placed in communication with the first stream 150, the grating 120 may be affixed to the second end 115 or telescoped, or expanded out.

In an embodiment, an underwater, preferably unmanned, remote operated vehicle (not shown) may be used to perform the methods disclosed herein.

Although explanatory embodiments have been shown and described, it would be appreciated by those skilled in the art that changes, alternatives, and modifications all falling into the scope of the appended claims and their equivalents can be made in the embodiments without departing from spirit and principles of the disclosure.

What is claimed is:

1. A subsea contaminate remediation apparatus comprising:
    a conduit having a length and a generally circular cross-sectional configuration, having a first diameter, extending along the length of the conduit:
    a first open end of the conduit adapted to receive a first liquid stream having at least one contaminate, the first open end of the conduit having a generally circular cross-sectional configuration, having a second diameter;
    a second open end of the conduit adapted to release a second liquid stream, the second open end of the conduit having a generally circular cross-sectional configuration, having a third diameter;
    the second diameter of the first open end of the conduit being substantially the same as the first diameter of the conduit;
    a grating associated with the second end of the conduit;
    at least one chemical injection port, located between the first and second ends of the conduit, wherein the chemical injection port is adapted to introduce a chemical to the first liquid stream to form the second liquid stream.

2. The subsea contaminate remediation apparatus of claim 1, including at least one in-situ burn port, connected to a source of an in-situ burn chemical.

3. The subsea contaminate remediation apparatus of claim 2, wherein the conduit has an outer wall surface, and the at least one chemical injection port and the at least one in-situ burn port are located on the outer wall surface of the conduit, and the at least one in-situ burn port is located above the at least one chemical injection port.

4. The subsea contaminate remediation apparatus of claim 1, wherein the first diameter of the conduit, the second diameter of the first end of the conduit, and the third diameter of the second end of the conduit are substantially the same.

5. The subsea contaminate remediation apparatus of claim 1, wherein the second end of the conduit has a distal portion, and the grating is associated with the distal portion of the second end of the conduit.

6. A method for remediating a contamination event using a subsea contaminate remediation apparatus, the subsea contaminate remediation apparatus comprising a conduit having: a first end adapted to receive a first liquid stream having at least one contaminate; a second end adapted to release a second liquid stream; a grating associated with the second end of the housing; at least one chemical injection port, wherein the chemical injection port is adapted to introduce a chemical to the first liquid stream to form the second liquid stream, the method comprising:

positioning the first end of the conduit of the subsea contaminate remediation apparatus in fluid communication with the first stream having a contaminate;

introducing the chemical through the at least one chemical injection port to the first stream to produce the second liquid stream;

directing the second liquid stream to flow past the grating and be turbulently released through the second end of the conduit of the subsea contaminate remediation apparatus.

7. The method of claim 6 further including: welding the apparatus to a source of discharging contaminate selected from the group consisting of: a wellhead, a blowout preventer, and a hull of a ship.

8. The method of claim 6, further including utilizing a dispersant as the chemical.

9. The method of claim 6, further including introducing an in-situ burn chemical to the second liquid stream.

10. The method of claim 9, further including oxidizing at least a portion of the contaminate in the second liquid stream.

* * * * *